(12) United States Patent
Yoshida et al.

(10) Patent No.: US 8,801,850 B2
(45) Date of Patent: Aug. 12, 2014

(54) COATING COMPOSITION, AND ITS PRODUCTION, HEAT EXCHANGER AND AIR CONDITIONER

(75) Inventors: Yasuhiro Yoshida, Tokyo (JP);
Yoshinori Yamamoto, Tokyo (JP);
Teruhiko Kumada, Tokyo (JP); Reiji Morioka, Tokyo (JP); Toshiaki Yoshikawa, Tokyo (JP); Yoshinori Tanikawa, Tokyo (JP); Tsukasa Takagi, Tokyo (JP); Hidetomo Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1149 days.

(21) Appl. No.: 12/523,063

(22) PCT Filed: Jan. 8, 2008

(86) PCT No.: PCT/JP2008/050073
§ 371 (c)(1),
(2), (4) Date: Jul. 14, 2009

(87) PCT Pub. No.: WO2008/087877
PCT Pub. Date: Jul. 24, 2008

(65) Prior Publication Data
US 2010/0096114 A1    Apr. 22, 2010

(30) Foreign Application Priority Data

Jan. 18, 2007   (JP) ................................. 2007-009153

(51) Int. Cl.
*F28F 13/18*   (2006.01)
*C08K 3/36*   (2006.01)
*B05D 5/00*   (2006.01)

(52) U.S. Cl.
USPC ........................ 106/287.34; 165/133; 524/493

(58) Field of Classification Search
USPC ........................ 106/287.34; 166/133; 524/493
IPC ................. F28F 13/18; C08K 3/36; B05D 5/00
See application file for complete search history.

(56) References Cited

U.S. PATENT DOCUMENTS

| 6,589,661 | B2 * | 7/2003 | Neely, Jr. ...................... 428/457 |
| 2003/0045626 | A1 * | 3/2003 | Tamori et al. ................. 524/547 |
| 2010/0154886 | A1 * | 6/2010 | Robinson et al. ............. 136/256 |

FOREIGN PATENT DOCUMENTS

| EP | 1 026 200 A1 | 8/2000 | |
| JP | 4 198287 | 7/1992 | |
| JP | 4 239636 | 8/1992 | |
| JP | 06073555 A * | 3/1994 | ............. C23C 22/00 |
| JP | 7-102207 | 4/1995 | |
| JP | 7-108319 | 4/1995 | |
| JP | 8-113756 | 5/1996 | |
| JP | 8-295844 | 11/1996 | |
| JP | 9 56625 | 3/1997 | |
| JP | 10 132483 | 5/1998 | |
| JP | 11-124534 | 5/1999 | |
| JP | 2001-26416 | 1/2001 | |
| JP | 2001 88247 | 4/2001 | |
| JP | 2003 160681 | 6/2003 | |
| JP | 2005 298837 | 10/2005 | |
| JP | 2006-519290 | 8/2006 | |
| KR | 2003053586 * | 7/2003 | |
| WO | WO 93/20775 | 10/1993 | |
| WO | WO 97/28898 | 8/1997 | |
| WO | WO 99/21919 | 5/1999 | |

OTHER PUBLICATIONS

Machine translation of KR2003053586.*
Machine translation of JP2005-298837.*
English translation of Nakamoto (JP 04-271872).*
Machine translation of Yamaguchi (JP06073555).*
Extended European Search Report issued Dec. 13, 2010, in Application No. / Patent No. 08702953.4-1217 / 2112207 PCT/JP2008050073.
Office Action issued Jan. 31, 2012 in Japanese Application No. 2008-554010 (w/English translation).
U.S. Appl. No. 13/254,511, filed Sep. 2, 2011, Yamamoto, et al.
"Purified Water" at http://en.wikipedia.org/wiki/Pure_Water accessed Jun. 26, 2013 8 pp.
Rogers, "Definition of Pure Water" at http://www.ehow.com/about_5047981_definition-pure-water.html accessed Jun. 26, 2013 3 pp.

* cited by examiner

*Primary Examiner* — Jun Li
(74) *Attorney, Agent, or Firm* — Oblon, Spivak, McClelland, Maier & Neustadt, L.L.P.

(57) ABSTRACT

A coating composition including ultrafine silica particles having an average particle diameter of 15 nm or less and fluororesin particles, in which ultrafine silica particle content is 0.1 to 5 mass %, and the mass ratio of the ultrafine silica particles to the fluororesin particles is 70:30 to 95:5. According to the coating composition, there is provided a coating film which makes it possible to readily coat the surfaces of various articles without impairing the color tone and the texture and which is excellent in antisoiling performance and durability.

15 Claims, 3 Drawing Sheets

COATING COMPOSITION, AND ITS PRODUCTION, HEAT EXCHANGER AND AIR CONDITIONER

TECHNICAL FIELD

The present invention relates to a coating composition, and its production, heat exchangers and air conditioners. More specifically, the present invention relates to a coating composition and its production for use in coating the surfaces of various articles, especially the surfaces of parts of an air conditioner (e.g., heat exchanger).

BACKGROUND ART

To the surfaces of various articles used indoors or outdoors, various kinds of dirt such as dust, soot, and cigarette tar, adhere. Therefore, various methods have been investigated for suppressing the adhesion of such dirt. For example, it is known that electrostatic adhesion of hydrophilic dirt such as dust can be suppressed by coating the surfaces of various articles with an antistatic agent. It is also known that lipophilic dirt such as soot can be readily removed by coating the surfaces of various articles with an oil-repellent fluororesin.

However, the above-mentioned methods of suppressing the adhesion of the above-mentioned various kinds of dirt pose a problem in that the antisoiling performance cannot be maintained over a long period of time due to peeling and deterioration of the coating film.

Consequently, a method has been attempted which maintains the antisoiling performance over a long period of time by forming a film in which hydrophilic portions and hydrophobic portions are mutually independently exposed in a minute region. For example, there has been disclosed a method of forming a film having hydrophilic portions and hydrophobic portions in a water-contacting region by a vapor phase method using a predetermined pattern filter (e.g., see Patent Document 1). There has also been disclosed a method of forming a resin coating film having a microphase-separated structure containing hydrophilic portions and hydrophobic portions by applying, to the surface of an article, a coating composition containing a polymer having a functional group, hydrophilic particles, metal alkoxide and a solvent (e.g., see Patent Document 2).

On the other hand, in a heat exchanger of an air conditioner for use in buildings, automobiles, etc., drops of water, which form from condensed water generated in cooling, form a bridge between fins attached to passages (pipes) through which a refrigerant passes, which narrows the ventilation flue of air, resulting in deterioration in the heat exchanging efficiency of the heat exchanger. Further, the drops of water produce a phenomenon of drops of water jumping out from an air conditioner, i.e., condensation splash. Then, the formation of the bridges due to drops of water has been prevented by boehmite treatment and hydrophilization treatment to the fin surfaces using water glass, a hydrophilic polymer, or a composition containing a hydrophilic polymer and an inorganic compound.

In the heat exchanger of an air conditioner, the adhesion of various kinds of dirt such as dust, soot, and cigarette tar causes not only a problem that the appearance is degraded but also hygienic problems originating from the dirt such as propagation of mold and bacteria, and from reductions in heat exchanger performance. In particular, such dirt becomes a factor in reducing the hydrophilicity of fin surfaces, which have been subjected to hydrophilization treatment, and producing drops of water on the surface of the fin, the factor which leads to deterioration in the heat exchanging efficiency of a heat exchanger and condensation splash.

Therefore, in order to avoid the hygienic problem and deterioration in the performance of a heat exchanger, mere hydrophilization of the heat exchanger is not sufficient and the adhesion of various kinds of dirt must be suppressed.

As a method of suppressing the adhesion of dirt to the heat exchanger of an air conditioner, there has been disclosed a method of forming a film in which an inorganic oxide and a hydrophobic resin are microscopically dispersed and exposed on the top surface of a fin by applying, to the surface of the fin, a coating composition containing an inorganic oxide including a photocatalytic oxide and a hydrophobic resin (e.g., see Patent Document 3). There has also been disclosed a method of forming a film in which silicone and a water-repellent fluororesin are microscopically dispersed and exposed on the top surface of a fin by applying, to the surface of a fin, a coating composition containing photocatalytic oxide particles, silicone and a water-repellent fluororesin (e.g., see Patent Document 4).

[Patent Document 1] JP 09-56625 A
[Patent Document 2] JP 2003-160681 A
[Patent Document 3] JP 2001-88247 A
[Patent Document 4] JP 10-132483 A

DISCLOSURE OF THE INVENTION

Problems to be Solved by the Invention

The method of Patent Document 1 poses a problem in that much time and labor are required because the method is difficult to apply to various articles used indoors or outdoors due to the limitation of the target articles (i.e., limited to articles having a water-contacting portion) and the necessity to form hydrophilic portions and hydrophobic portions by a vapor phase method. In the method of Patent Document 2, since a film obtained using a coating composition is a resin coating film, durability is insufficient and the color tone and texture of the surface of the article used as a base are degraded. Therefore, the method of Patent Document 2 has a problem that applicable portions are limited. Further, since the methods of Patent Documents 3 and 4 are based on the hydrophilization of the inorganic oxide or silicone due to a photocatalytic oxide, excellent antisoiling performance cannot be achieved when photoirradiation is not sufficient.

When the article to be coated is the heat exchanger of an air conditioner, the methods of Patent Documents 3 and 4 pose the following problems. According to the methods of Patent Documents 3 and 4, although it can be made difficult for drops of water accumulating between the fins to adhere, minute drops of water, which have been formed before accumulating between the fins and removed, form mist-like water, and then the mist-like water is sprayed out from an air conditioner, or, depending on circumstances, condensation splash occurs, because a coating film formed on the fins has hydrophobic portions in a higher proportion than hydrophilic portions (i.e., film is hydrophobic as a whole). Therefore, the methods of Patent Documents 3 and 4 are inapplicable to, in particular, heat exchangers used for an indoor air conditioner. Moreover, the method of Patent Document 1 can not be practically applied to a heat exchanger of an air conditioner because the method requires much time and labor. Further, the method of Patent Document 2 has the same problems as that of the methods of Patent Documents 3 and 4 because the formed coating film has hydrophobic portions in a higher proportion than hydrophilic portions.

Therefore, the present invention has been made in order to solve the above-mentioned problems. An object of the invention is to provide a coating composition and its production which provide a coating film which can readily coat the surfaces of various articles without impairing the color tone and texture of the surfaces and which is excellent in antisoiling performance and durability.

Another object of the present invention is to provide a heat exchanger and an air conditioner which are excellent in the antisoiling performance and which do not cause condensation splash.

Means for Solving the Problems

A coating composition of the present invention disperses ultrafine silica particles having an average particle diameter of 15 nm or less and fluororesin particles, in which ultrafine silica particle content is 0.1 to 5 mass %, and mass ratio of the ultrafine silica particles to the fluororesin particles is 70:30 to 95:5.

Further, a coating method for producing a coating composition of the present invention includes dispersing ultrafine silica particles having an average-particle diameter of 15 nm or less in water having an ionic impurities concentration of 200 ppm or less to prepare an ultrafine silica particle dispersion, dispersing fluororesin particles having an average particle diameter of 50 to 500 nm in water having an ionic impurities concentration of 200 ppm or less to prepare a fluororesin particle dispersion, and mixing the ultrafine silica particle dispersion and the fluororesin particle dispersion.

Further, a heat exchanger of the present invention includes pipes through each of which a refrigerant passes and a large number of fins attached to the pipes, wherein a coating film interspersing fluororesin particles having art average particle diameter of 50 to 500 nm in a silica film consisting of ultrafine silica particles having an average particle diameter of 15 nm or less is formed on at least one surface of the pipes and fins.

In addition, an air conditioner of the present invention includes a fan, a heat exchanger, a vane and a flap, wherein a coating film interspersing fluororesin particles having an average particle diameter of 50 to 500 nm in a silica film consisting of ultrafine silica particles having an average particle diameter of 15 nm or less is formed on at least one surface of the fan, heat exchanger, vane and flap.

Effects of the Invention

According to the present invention, there are provided a coating composition and its production which makes it possible to readily coat the surfaces of various articles without impairing the color tone and the texture of the articles and to provide a coating film excellent in the antisoiling performance and durability.

Further, according to the present invention, there are also provided a heat exchanger and an air conditioner which have excellent antisoiling performance and which do not cause condensation splash.

BEST MODE FOR CARRYING OUT THE INVENTION

Embodiment 1

A coating composition of the present invention contains ultrafine silica particles and fluororesin particles.

In a coating film formed from the coating composition of the present invention, ultrafine silica particle serve as a dense silica film having fine pores. In the silica film, dirt barely adheres thereto compared to the case of a silica film and the like formed by silicate methods, sol gel methods, etc.

The average particle diameter of ultrafine silica particles is 15 nm or less, preferably 4 nm to 12 nm, as determined by light scattering measurement. By introducing ultrafine silica particles having an average particle diameter in the above-mentioned range to a coating composition, the ultrafine silica particles are easy to agglomerate when the coating composition is dried, thereby facilitating the solidification of the coating composition. Moreover, silica components that are dissolved in a balanced manner in the coating composition increase, so a coating film having a relatively high strength can be obtained even if a special binder is not incorporated. Further, because light scattering of ultrafine silica particles decreases, the transparency of a coating film to be obtained can be improved, and changes in the color tone and texture of the surface of an article can be suppressed. When the average particle diameter of ultrafine silica particles is more than 15 nm, the obtained coating film does not have sufficient strength. When the average particle diameter of ultrafine silica particles is less than 4 nm, the stability of the coating composition may reduce or the strength and antisoiling performance of the coating film to be obtained may be degraded.

The content of the ultrafine silica particles in the coating composition is 0.1 to 5 mass %, preferably 0.3 to 2.5 mass %. When the content falls in the above-mentioned range, a uniform and thin coating film can be formed without impairing the color tone and texture of the surface of an article. When the content of the ultrafine silica particles is less than 0.1 mass %, the obtained coating film is excessively thin and the desired antisoiling performance is difficult to achieve. On the other hand, when the content of the ultrafine silica particles is more than 5 mass %, the coating film becomes non-uniform and cloudy, cracks easily form, and peeling of the film is likely to occur.

Examples of fluororesin particles include polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), ethylene-chlorotrifluoroethylene copolymer (ECTFE), polyvinylidene fluoride (PVDF), polychlorotrifluoroethylene (PCTFE), polyvinyl fluoride (PVF), their copolymers, their mixtures, and substances obtained by mixing another resin to these fluororesins. Among them, PTFE and FEP having excellent stability and high hydrophobicity are preferable.

The average particle diameter of fluororesin particles is not limited, and is preferably 50 to 500 nm, more preferably 100 to 250 nm in the case where the average particle diameter of fluororesin particles is determined by light scattering measurement. By introducing fluororesin particles having the average particle diameter in the above-mentioned range to a coating composition, fluororesin particles are suitably dispersed in a coating film and the particles are easily exposed to the surface of the coating film, thereby achieving excellent antisoiling performance. When the average particle diameter of fluororesin particles is less than 50 nm, a coating composition may not be imparted with stability or it becomes difficult to expose fluororesin particles to the surface of a coating film, whereby a desired antisoiling performance may not be achieved. On the other hand, when the average particle diameter of fluororesin particles is more than 500 nm, the region of hydrophobic portions increases and irregularities of a coating film are extended excessively, which may result in the desired antisoiling performance not being achieved.

Figure 1:
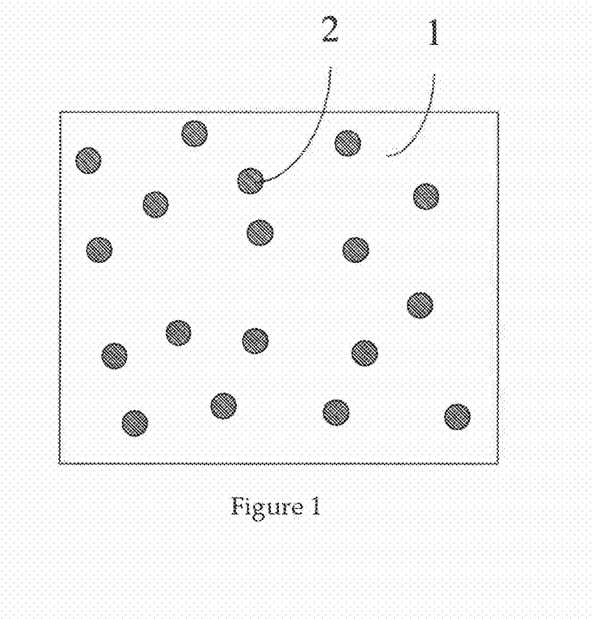
FIG. 1 is a view schematically illustrating a top surface of a coating film formed from a coating composition containing ultrafine silica particles and fluororesin particles in a mass ratio of 80:20.

The mass ratio of ultrafine silica particles to fluororesin particles in the coating composition is 70:30 to 95:5, preferably 75:25 to 90:10. When the mass ratio is in the above-mentioned range, a coating film in which hydrophilic portions originating from ultrafine silica particles and hydrophobic portions originating from fluororesin particles are mixed in a balanced manner can be obtained by drying at room temperature, and the coating film to be formed is imparted with excellent antisoiling performance. Here, as an example, FIG. 1 illustrates the upper surface of a coating film formed from a coating composition in which the mass ratio of ultrafine silica particles to fluororesin particles is 80:20. In this coating film, fluororesin particles 2 (hydrophobic portion) are interspersed in a silica film 1 (hydrophilic portion) consisting of ultrafine silica particles. Because the area of the hydrophilic portion is sufficiently larger than the area of the hydrophobic portion on the surface of the coating film, the coating film is hydrophilic as a whole. The hydrophilic portion on the surface of the coating film plays an important role in improving the antisoiling performance. More specifically, the hydrophilic portion is continuous without being fragmented by the hydrophobic portions on the surface of the coating film. Therefore, when drops of water and the like adhere to the surface of the coating film, the coating film shows a characteristic that the water easily spreads throughout the film. Then, this water produces the effects of lifting and removing hydrophilic dirt and hydrophobic dirt which have adhered to the surface of the coating film, and of making it difficult for such dirt to adhere. At the time of condensation, raining, cleaning, etc., adhered dirt is easily removed from the surface of the coating film. In addition, because the coating film mainly contains a continuous silica film, electrification of the film surface leading to adhesion of dirt can be suppressed. Further, with respect to the coating film, the silica film and the fluororesin particles are oil repellent, so oil droplets barely adhere to the film.

Figure 2:
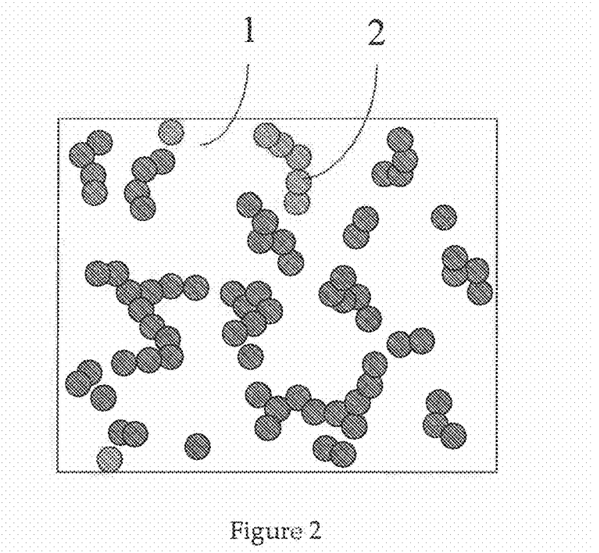
FIG. 2 is a view schematically illustrating a top surface of a coating film formed from a coating composition containing ultrafine silica particles and fluororesin particles in a mass ratio of 50:50.

On the other hand, when the proportion of ultrafine silica particles is more than the above-mentioned range, although the obtained coating film can efficiently prevent the adhesion of hydrophobic dirt such as soot and carbon, hydrophilic dirt such as sand dust and dust is likely to adhere to the film. When the proportion of ultrafine silica particles is less than the above-mentioned range, although the obtained coating film can efficiently prevent the adhesion of the hydrophilic dirt such as sand dust and dust, hydrophobic dirt such as soot and carbon is likely to adhere to the film. Here, as an example, FIG. 2 schematically illustrates the top surface of a coating film formed from a coating composition in which the mass ratio of ultrafine silica particles to fluororesin particles is 50:50. In the coating film, because the proportion of the fluororesin particles is less than that of the ultrafine silica particles, the hydrophobic portion increases and the fluororesin particles 2 agglomerate or the fluororesin particles 2 come close to one another in the silica film 1 consisting of the ultrafine silica particles. Therefore, when drops of water adhere to the coating film, water cannot spread throughout the silica film 1 due to the fluororesin particles 2. Therefore, this coating film cannot be imparted with the above-mentioned excellent antisoiling performance.

The adhesion of hydrophilic dirt such as sand dust and dust is generally caused by electrostatic binding of hydrophilic groups, liquid bridge formation by water or the like, or intermolecular force. Sand dust refers to minute particles having a particle diameter of several micrometers to several tens of micrometers, and dust refers to particles whose particle diameter is much larger than that of sand dust. In order to prevent the adhesion of hydrophilic dirt due to the electrostatic binding of hydrophilic groups, it is necessary to form a coating film not containing hydrophilic portions having dimensions allowing the hydrophilic dirt to adhere.

In the coating composition of the present invention, by adjusting the mass ratio of ultrafine silica particles to fluororesin particles to the above-mentioned range, the hydrophobic portions (fluororesin particles 2) are moderately dispersed in the hydrophilic portion (silica film 1 consisting of ultrafine silica particles) as illustrated in FIG. 1, whereby a coating film containing very few hydrophilic portions having dimensions allowing the hydrophilic dirt to stably adhere is formed. Therefore, the coating film can prevent the adhesion of hydrophilic dirt due to electrostatic binding of hydrophilic groups. Even when hydrophilic dirt adheres to the hydrophilic portion in the coating film, the hydrophilic dirt cannot sufficiently adhere to the hydrophilic portion due to physical impediments on the surface of the hydrophobic portion close to the hydrophilic portion or the projection of the hydrophobic portion, which makes it difficult for the hydrophilic dirt to easily adhere to the film. Moreover, the hydrophilic portion of the coating film is the silica film 1 which is porous consisting of ultrafine silica particles. Therefore, even if liquid bridge formation by water or the like occurs, water between the ultrafine silica particles is easily removed rapidly from the surface of the silica film in a drying process. It should be noted that the coating composition of the present invention does not contain a binder and an organic polymer as constitutional components. Therefore, after the liquid bridge formation is eliminated, the condition on the surface of the coating film is not changed due to the deposition of a binder, an organic polymer, etc., on the surface of the coating film. Further, because the silica film 1 consisting of ultrafine silica particles has very minute pores and has a low density, a portion to which the hydrophilic dirt adheres due to the intermolecular force is also small.

On the other hand, hydrophobic dirt such as soot and carbon generally adheres due to intermolecular force or hydrophobic binding in the case where water exists. Hydrophobic dirt is formed by minute particles, which have a particle diameter of generally 1 μm or less, and most of which have a particle diameter of 0.3 μm or less. When the surface of the coating film is hydrophobic, hydrophobic dirt is likely to adhere. When hydrophobic dirt is in contact with the hydrophobic surface in a state where the surface is covered with condensation water or the like, the hydrophobic dirt may stick to the hydrophobic surface due to a hydrophobic binding force between the hydrophobic surface and the hydrophobic dirt caused by water cohesion.

In the coating composition of the present invention, a coating film in which the hydrophobic portions (fluororesin particles 2) are moderately dispersed in the hydrophilic portion (silica film 1 consisting of ultrafine silica particles) as illustrated in FIG. 1 is formed by adjusting the mass ratio of the ultrafine silica particles to the fluororesin particles to the above-mentioned range, whereby the adhesion of hydrophobic dirt can be prevented due to the presence of hydrophilic groups on the surface of the coating film and water adhering to the surface thereof.

The water contained in the coating composition of the present invention is not limited, and is preferably water containing few ionic impurities having two or more valences, such as calcium ions and magnesium ions, from the viewpoint of dispersion stability of ultrafine silica particles. To be specific, the concentration of the ionic impurities is preferably 200 ppm or lower, more preferably 50 ppm. When the concentration of the ionic impurities is more than 200 ppm, ultrafine silica particles may agglomerate and precipitate or the strength and transparency of the coating film to be obtained may be degraded. The content of water is not limited, and may be suitably adjusted in accordance with the coating method and the like.

In general, the content of water is 30 to 99.5 mass %. The coating composition may contain an organic solvent and the like so as to adjust the stability, spreading properties, and drying properties as a coating composition.

In addition to the above-mentioned components, the coating composition of the present invention can further contain fine silica particles whose average particle diameter is 20 to 200 nm. By incorporating fine silica particles whose average particle diameter falls in the above-mentioned range to the coating composition, minute irregularities can be formed on the surface of the coating film to be obtained. The formation of the minute irregularities originates from the formation of minute pores in the coating film and the formation of a convex portion on the coating film due to presence of fine silica particles. Hydrophilicity increases as the minute irregularities on the hydrophilic surface extend. As a result, improvement in the hydrophilicity on the surface of the coating film makes it more difficult for hydrophobic dirt to adhere, and the extension in the minute irregularities on the hydrophilic surface can reduce the adhesive property of hydrophilic dirt. When the particle diameter of the fine silica particles is less than 20 nm, irregularities of a desired dimension are not formed on the surface of the coating film, and therefore the effect caused by incorporating the fine silica particles may not be achieved. On the other hand, when the particle diameter of the fine silica particles is more than 200 nm, irregularities formed on the surface of the coating film to be obtained extend excessively, which results in minute dirt being likely to be caught by the irregularities on the surface, thus reducing the antisoiling performance.

When the coating composition of the present invention contains the above-mentioned fine silica particles, the content of the fine silica particles is preferably 0.1 to 20 parts by mass based on 100 parts by mass of the total of the ultrafine silica particles and the fine silica particles. By incorporating fine silica particles whose content falls in the above-mentioned range, minute irregularities having a desired dimension can be formed on the surface of the coating film to be obtained, thereby increasing the hydrophilicity. When the content of fine silica particles is less than 0.1 part by mass, the effect of improving the hydrophilicity caused by incorporating fine silica particles may not be achieved. On the other hand, when the content of fine silica particles is more than 20 parts by mass, the strength of the coating film to be obtained may decrease.

The coating composition of the present invention can further contain a surfactant, an organic solvent, etc., from the viewpoint of increasing the wettability of the coating composition and the adhesive property of the coating film. The coating composition of the present invention can further contain a coupling agent and a silane compound. When the coupling agent and the silane compound are added, the effects of increasing the transparency of the coating film, increasing the film strength of the coating film, and adjusting the hydrophilicity of the coating film can all be obtained in addition to the above-mentioned effects.

There is no limitation on the surfactant, and various kinds of surfactants such as anionic surfactants or nonionic surfactants can be mentioned. Among the above-mentioned surfactants, surfactants having low foamability such as polyoxypropylene-polyoxyethylene block polymers and polycarboxylic acid type anionic surfactants are preferable, because such surfactants are easy to use.

There is no limitation on the organic solvent, and various organic solvents such as various alcoholic solvents, glycol solvents, ester solvents, and ether solvents can be mentioned.

Examples of the coupling agent are not particularly limited, but include amino-based coupling agents such as 3-(2-aminoethyl)aminopropyl trimethoxy silane, epoxy-based coupling agents such as 3-glycidoxypropyltrimethoxy silane, methacryloxy-based coupling agents such as 3-methacryloxy propyl methyldimethoxy silane, mercapto-based coupling agents, sulfide-based coupling agents, vinyl-based coupling agents, and ureide-based coupling agents.

Examples of the silane compound are not particularly limited, but include halogen-containing substances such as trifluoropropyl trimethoxy silane and methyl trichlorosilane, alkyl group-containing substances such as dimethyldimethoxy silane and methyl trimethoxy silane, silazane compounds such as 1,1,1,3,3,3-hexamethyl disilazane, and oligomers such as methylmethoxy siloxane.

The contents of these components are not limited insofar as the properties of the coating composition of the present invention are not adversely affected. The contents thereof may be suitably adjusted in accordance with selected component.

The coating composition of the present invention may contain impurities insofar as the ultrafine silica particles and fluororesin particles are not agglomerated or precipitated and the antisoiling performance of the coating film to be obtained is not adversely affected.

However, when the coating film is used in an environment where the film is exposed to water, it is preferable that the amount of alkali metals (e.g., sodium and potassium) as impurities be small. When the content of alkali metals is high in the coating composition of the present invention, the amount of silica components which melt in water from the coating film may increase, thereby changing the balance between the hydrophilic portion and the hydrophobic portions of the coating film, resulting in reduced antisoiling performance. Moreover, when the content of alkali metals is high in the coating composition of the present invention, an organic vapor is likely to be adsorbed to the coating film. Thus, an adsorbed offensive odor may be emitted due to temperature changes and the like, which makes consumers feel uncomfortable or adsorbed organic acid or the like may cause corrosion and discoloration in coated articles. Such problems can be avoided by adjusting the composition of the coating composition or by exposing the coating film to water beforehand. However, as such treatment requires labor, it is preferable to reduce the amount of alkali metals as impurities beforehand. There is no limitation on the methods of reducing the amount of alkali metals as impurities, and, for example, an ion exchange resin or the like may be used.

In the coating composition of the present invention, the amount of alkali metals contained as impurities is preferably 0.5 part by mass or lower, more preferably 0.1 part by mass or lower, based on 100 parts by mass of silica component. Here, the silica component refers to ultrafine silica particles alone when the coating composition does not contain fine silica particles, and refers to ultrafine silica particles and fine silica particles when the coating composition contains fine silica particles.

The method of producing the coating composition of the present invention is not particularly limited. For example, the coating composition can be produced by mixing a dispersion of ultrafine silica particles and a dispersion of fluororesin particles.

Here, as the dispersion of the ultrafine silica particles, a dispersion in which ultrafine silica particles having an average particle diameter of 15 nm or less are dispersed in a polar solvent such as water may be used, and a commercially available colloidal silica can also be used. In the dispersion, it is preferable that the volume ratio of the ultrafine silica particles be 20% or lower. When the volume ratio is more than 20%, the stability of the dispersion is reduced, and thus such a volume ratio is not preferable.

As the dispersion of fluororesin particles, it is preferable to use a dispersion in which fluororesin particles are dispersed in water. As such a dispersion, a dispersion containing a surfactant for uniformly dispersing the fluororesin particles may be used.

When mixing a dispersion of ultrafine silica particles and a dispersion of fluororesin particles, it is preferable to adjust the pH of each of the dispersions to the same level from the viewpoint of preventing the ultrafine silica particles from agglomerating.

The coating composition of the present invention thus produced can coat the surfaces of various articles. The coating methods are not limited, and the coating can be performed by conventionally known methods.

Mentioned as a coating method suitable for using the coating composition of the present invention is a method of forming a coating film on the surface of an article by applying the coating composition to the surface of the article, and then removing excess coating composition by using an air stream. In particular, by removing excess coating composition by an air stream, a thin coating film in which fluororesin particles are uniformly dispersed in a silica film can be rapidly obtained. Because the coating film obtained by such a method is a thin film having a thickness of about 0.05 to 1 μm and having a high transparency, the color tone and texture of the surface of an article to which the coating film is applied are not impaired. Further, the cost required for coating can be reduced, because the method does not require any special steps, facilities, etc.

When excess coating composition is not removed by an air stream, the excess coating composition may remain on the surface of an article, which may increase the thickness of the coating film formed at a portion where the excess coating composition remains. In such a case, cracks are formed in the coating film, which may result in the strength of the coating film being reduced or the coating film becoming cloudy. Moreover, it may take time for drying the coating film. Further, as a result of the prolonged drying time, fluororesin particles may gather on the air interface and thus the hydrophobicity on the surface of the coating film may increase, which may result in that the desired antisoiling performance cannot be achieved.

Here, there is no limitation on the method of applying the coating composition to the surface of an article, and the application can be performed by known methods such as dipping and spreading. As the spreading method, the spreading can be performed not only by spreading using, for example, a brush or various coaters but also by covering a coating composition over an article.

The air stream for removing the coating composition is not limited, and for example, air can be used.

The air stream flow rate for removing the coating composition is not limited because the air stream flow rate depends on the form, dimension, etc., of an article. The air stream flow rate is generally 5 m/second or more, preferably 10 m/second or more. When an article having minute gaps and pores is to be coated, the air stream flow rate is preferably 15 m/second or more so as to remove the coating composition from the gaps and pores.

The upper limit of temperatures of the air stream for removing the coating composition is preferably 100° C. or lower, more preferably 80° C. or lower. When the temperature is more than 100° C., problems in a silica film degeneration or hydrophobicity of the coating film becoming excessively high may arise. The lower limit of temperatures of the air stream for removing the coating composition is preferably 15° C. or more. When the temperature is lower than 15° C., the drying time is prolonged, and the hydrophobicity of the coating film becomes high, which may result in that the desired antisoiling performance cannot be obtained.

The time for blowing the air stream for removing the coating composition is not limited because the blowing time depends on the temperature of the air stream, the form and dimension of an article, etc. In general, the blowing time is 2 to 60 seconds. When an article having minute gaps and pores is a coating target, the blowing time is preferably 5 to 150 seconds so as to remove the coating composition from the gaps and pores.

It should be noted that when an article to be coated has a complicated form, excess coating composition cannot be thoroughly removed by an air stream. This may cause a problem that a coating film formed at a portion where the coating composition remains shows a reduction in strength and becomes cloudy. Even in this case, by continuously blowing an air stream until the moisture of the coating composition is evaporated and the flowability thereof is lost, only the phenomenon in which the hydrophobicity on the surface of the coating film becomes high can be suppressed. The conditions of the air stream used here may be the same as those of the air stream for removing the coating composition, but the air stream speed may be slowed. It should be noted that the air stream speed is preferably 0.5 m/second or more.

The coating of the coating composition of the present invention can also be carried out without using the above-mentioned air stream.

For example, a dipping method can avoid unevenness resulting from dripping of the coating composition in a coating film by dipping an article in a coating composition, and then slowly pulling up the article. In the case of the dipping method or a spreading method, excess coating composition can be removed by shaking off by, for example, rotating an article to which the coating composition has been applied by dipping or spreading.

In order to more surely eliminate unevenness of the coating film or increase the thickness of the coating film, the above-mentioned coating methods may be repeated.

When dipping or spreading by using a brush or various coaters is difficult to perform, it is sometimes preferable to perform coating by spraying. According to a spraying coating method, the occurrence of an interference color due to a thin coating film can be prevented, because minute irregularities are formed on the coating film. However, when coating is performed by spraying, attention should be paid to prevent excessive irregularities from forming on the coating film. This is because, when irregularities are large, there is a possibility that the desired antisoiling performance may not be obtained or a part of the surface of an article may not be covered.

Here, there is no limitation on the article to which the coating composition of the present invention is applied. Various articles used indoors or outdoors may be used to which various kinds of hydrophilic dirt and hydrophobic dirt such as dust, soot, and cigarette tar adhere.

Moreover, depending on the article to be coated, the surface of an article can be subjected to pretreatment such as corona treatment and UV treatment, from the viewpoint of increasing the wettability of the coating composition and adhesive property of the coating film of the present invention.

According to the above-mentioned coating method of the present invention, because the ultrafine silica particles solidify simply by drying, the fluororesin particles can stick to the surface of the coating film without the necessity of heating.

Embodiment 2

The heat exchanger of the present invention is provided with a coating film formed from the above-mentioned coating composition. More specifically, the heat exchanger of the present invention is provided with a coating film which comprises ultrafine silica particles having an average particle diameter of 15 nm or less and fluororesin particles, in which the content of the ultrafine silica particle is 0.1 to 5 mass % and the mass ratio of the ultrafine silica particles to the fluororesin particles is 70:30 to 95:5.

Figure 3:
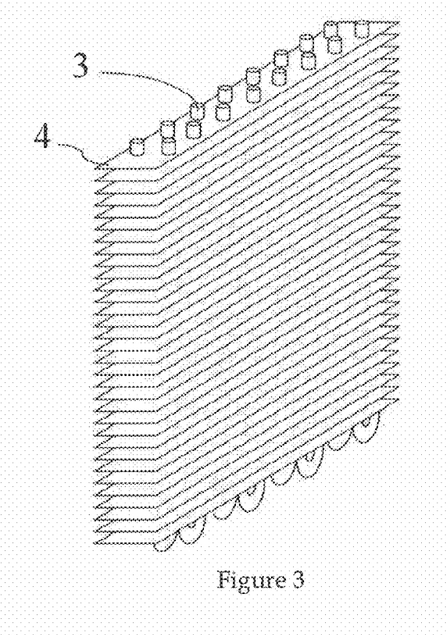
FIG. 3 is a perspective view of a heat exchanger according to Embodiment 2 of the present invention.

FIG. 3 illustrates a perspective view of the heat exchanger according to this embodiment. In FIG. 3, the heat exchanger is provided with pipes 3 through each of which a refrigerant passes and a large number of fins 4 attached to the pipes 3. On the surfaces of the pipes 3 and/or the fins 4, the coating film formed from the coating composition of the present invention is formed. Because the coating film is excellent in antisoiling performance and durability, the coating film can avoid degradation in appearance, hygienic problems originating from dirt such as propagation of mold or bacteria, and degradation in the performance of the heat exchanger. Further, because the coating film is hydrophilic as a whole, the formation of bridges between the fins 4 due to drops of water can be avoided, and condensation splash and degradation in the performance of the heat exchanger can also be prevented. Therefore, the heat exchanger of the present invention can be used particularly for air conditioners used indoors.

Embodiment 3

The air conditioner of the present invention is provided with a part having a coating film formed from the above-mentioned coating composition. More specifically, the air conditioner of the present invention is provided with a part having a coating film which comprises ultrafine silica particles having an average particle diameter of 15 nm or less and fluororesin particles, in which the content of the ultrafine silica particle is 0.1 to 5 mass % and the mass ratio of the ultrafine silica particles to the fluororesin particles is 70:30 to 95:5.

Here, the part is not limited, and parts to which dirt, drops of water, etc. adhere are mentioned. Mentioned as such parts are parts provided on an air duct of a heat exchanger, a fan, a vane, a flap, etc. Among them, a heat exchanger is preferable for the above-mentioned reason.

Figure 4:
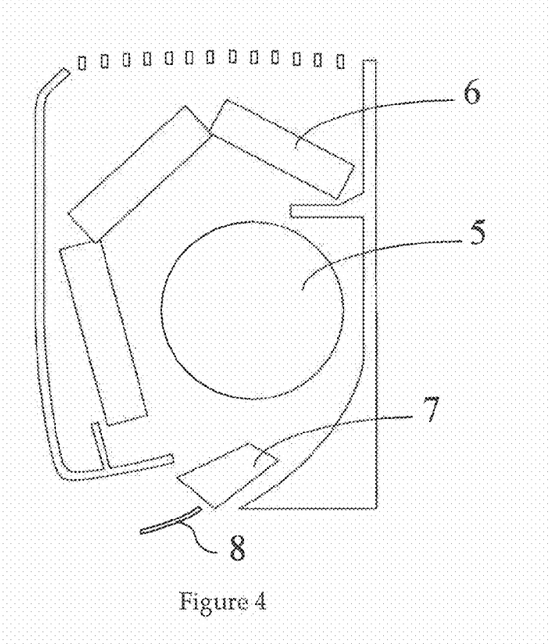
FIG. 4 is a cross sectional view of an air conditioner according to Embodiment 3 of the present invention.

FIG. 4 illustrates a cross sectional view of an air conditioner according to this embodiment. In FIG. 4, the air conditioner is provided with a fan 5, a heat exchanger 6, a vane 7, and a flap 8. On the surface of at least one of the fan 5, the heat exchanger 6, the vane 7, and the flap 8, the coating film formed from the coating composition of the present invention is formed. Because the coating film is excellent in antisoiling performance and durability, the coating film can avoid degradation in appearance, hygienic problems originating from dirt such as propagation of mold or bacteria, and degradation in the performance of the heat exchanger. Further, because the coating film is hydrophilic as a whole, condensation splash can be prevented even when drops of water adhere to the film.

EXAMPLES

Hereinafter, the present invention will be described in detail by Examples, but it is not limited thereto.

Examples 1 to 4

Colloidal silica containing pure water and ultrafine silica particles having an average particle diameter of 6 nm and a PTFE dispersion containing PTFE particles having an average particle diameter of 250 nm were mixed under stirring, and then a nonionic surfactant (polyoxyethylene alkyl ester) was further added followed by mixing under stirring, thereby preparing coating compositions each having the composition shown in Table 1. Note that the content of the nonionic surfactant in the coating composition was 0.1 mass %.

Examples 5 to 8

Colloidal silica containing fine silica particles having an average particle diameter of 70 nm was further added to each of the coating compositions obtained in Examples 1 to 4, followed by mixing and stirring, thereby preparing coating compositions each having the composition shown in Table 1.

Comparative Examples 1 and 2

In Comparative Examples 1 and 2, colloidal silica containing ultrafine silica particles having an average particle diameter of 6 nm and a PTFE dispersion containing PTFE particles having an average particle diameter of 150 nm were used separately, thereby preparing a coating composition having the composition shown in Table 1.

Comparative Example 3

Following a method similar to that of Example 1, a coating composition having the composition shown in Table 1 was prepared.

|  | Ultrafine silica particles (mass %) | PTFE particles (mass %) | Fine silica particles (mass %) |
| --- | --- | --- | --- |
| Example 1 | 3.0 | 0.5 | — |
| Example 2 | 3.0 | 1.0 | — |
| Example 3 | 0.7 | 0.2 | — |
| Example 4 | 0.7 | 0.1 | — |
| Example 5 | 3.0 | 0.5 | 0.1 |
| Example 6 | 3.0 | 1.0 | 0.1 |

-continued

|  | Ultrafine silica particles (mass %) | PTFE particles (mass %) | Fine silica particles (mass %) |
|---|---|---|---|
| Example 7 | 0.7 | 0.2 | 0.1 |
| Example 8 | 0.7 | 0.1 | 0.1 |
| Comparative Example 1 | 3.0 | — | — |
| Comparative Example 2 | — | 1.0 | — |
| Comparative Example 3 | 6.0 | 1.0 | — |

Each of the coating compositions of Examples 1 to 8 and Comparative Examples 1 to 3 was applied to a stainless steel base material by a predetermined method, and then excess coating composition was removed by applying an air blow of 30° C. at 35 m/second for 20 seconds, thereby forming a coating film on the stainless steel base material. The obtained coating films were evaluated for the properties, contact angle, and antisoiling performance (sand dust adhesion property, dust adhesion property, and coloration). The results are shown in Table 2.

In addition, for the coating compositions of Examples 1 to 4, the coating films formed in the same manner as described above using a polystyrene base material as the base material were also evaluated. The polystyrene used as the base material was subjected to UV treatment by a low pressure mercury lamp before coating. The results are shown in Table 3.

Here, the properties of the coating film were evaluated by visual observation.

Contact angle means the static contact angle of water. The contact angle was determined using a contact angle meter (DM100, manufactured by Kyowa Interface Science Co., Ltd.)

Sand dust adhesion property is a criterion for evaluating the adhesion property of hydrophilic dust. To be specific, the sand dust adhesion property was evaluated using a 1 to 5 scale by visually observing coloration caused by adhesion of Kanto loam dust, which had been air sprayed in a predetermined amount to the surface of the coating film. In this evaluation, coating film to which Kanto loam dust barely adhered was evaluated as "1" and coating film to which a great deal of Kanto loam dust adhered was evaluated as "5".

Dust adhesion property is a criterion for evaluating the adhesion property of hydrophobic dust. To be specific, the dust adhesion property was evaluated using a 1 to 5 scale by visually observing coloration caused by adhesion of carbon black, which had been air sprayed in a predetermined amount to the surface of the coating film. In this evaluation, coating film to which carbon black barely adhered was evaluated as "1" and coating film to which a great deal of carbon black adhered was evaluated as "5".

Coloration was evaluated based on a 1 to 5 scale by visually observing the degree of coloration of the base material having the coating film, which was let stand in cigarette smoke for 2 hours. In this evaluation, coating film which was barely colored was evaluated as "1" and coating film which was notably colored was evaluated as "5".

The same evaluation methods as described above were applied to the following Examples, unless another measurement method is specified.

TABLE 2

|  | Coating method | Properties of coating film | Contact angle (°) | Sand dust adhesion property | Dust adhesion property | Coloration |
|---|---|---|---|---|---|---|
| Example 1 | Spraying | Slightly cloudy film | 15 | 2 | 2 | 3 |
| Example 2 | Spraying | Slightly cloudy film | 80 | 1 | 3 | 1 |
| Example 3 | Dipping | Transparent film | 25 | 2 | 1 | 4 |
| Example 4 | Dipping | Transparent film | 9 | 2 | 2 | 2 |
| Example 5 | Spraying | Slightly cloudy film | 12 | 2 | 2 | 3 |
| Example 6 | Spraying | Slightly cloudy film | 70 | 1 | 2 | 2 |
| Example 7 | Dipping | Slightly cloudy film | 13 | 1 | 2 | 3 |
| Example 8 | Dipping | Slightly cloudy film | 7.5 | 2 | 2 | 1 |
| Comparative Example 1 | Spraying | Transparent film | 10 | 5 | 5 | 5 |
| Comparative Example 2 | Spraying | Cloudy and film peeling | 90 | 3 | 5 | 5 |
| Comparative Example 3 | Spraying | Adhesion of particles | — | — | — | — |

TABLE 3

|  | Coating method | Properties of coating film | Contact angle (°) | Sand dust adhesion property | Dust adhesion property | Coloration |
|---|---|---|---|---|---|---|
| Example 1 | Spraying | Transparent film | 20 | 2 | 1 | 3 |
| Example 2 | Spraying | Slightly cloudy film | 88 | 1 | 3 | 3 |
| Example 3 | Dipping | Transparent film | 32 | 2 | 2 | 3 |
| Example 4 | Dipping | Transparent film | 95 | 2 | 2 | 2 |
| Polystyrene | — | — | 76 | >5[*] | >5[*] | 5 |

[*]The adhesion amount was larger than that of Comparative Example 1.

As shown in Table 2, using each of the coating compositions of Examples 1 to 8 and Comparative Example 1, a uniform and thin coating film was successfully formed on the stainless steel base material. Further, as shown in Table 3, using each of the coating compositions of Examples 1 to 4, a uniform and thin coating film was successfully formed on the polystyrene base material.

In contrast, with the coating composition of Comparative Example 2 (coating composition containing no ultrafine silica particles), a coating film could not be formed on the stainless steel base material. Further, with the coating composition (coating composition in which the content of ultrafine silica particles is excessively high) of Comparative Example 3, a non-uniform coating film was formed on the stainless steel base material and cracks were formed in the film, resulting in the film being easily peeled.

The coating films obtained from the coating compositions of Examples 1 to 8 had lower evaluation values with respect to the sand dust adhesion property, dust adhesion property, and coloration and had better antisoiling performance as compared with that of the coating film obtained from the coating composition of Comparative Example 1. Further, the coating films obtained from the compositions of Examples 5 to 8 (coating composition containing fine silica particles) had better antisoiling performance as compared with that of the coating films obtained from Examples 1 to 4 (coating compositions containing no fine silica particles).

In addition, as shown in the evaluation results of the contact angle of the coating film obtained from the coating compositions of Examples 1 to 8, it was found that macroscopic properties (hydrophilicity or hydrophobicity) of the coating film were successfully adjusted by adjusting the content (mass ratio) of ultrafine silica particles and fluororesin particles.

Examples 9 and 10

In Examples 9 and 10, coating compositions having the same composition as in Example 1 were prepared in the same manner as in Example 1 except for changing the type of fluororesin particles. As the fluororesin particles, FEP particles having an average particle diameter of 200 nm were used in Example 9, and PVDF particles having an average particle diameter of 250 nm were used in Example 10.

Subsequently, using each of the coating compositions, a coating film was formed on a stainless steel base material in the same manner as in Example 1. The coating films were evaluated for the properties, contact angle, and antisoiling performance (sand dust adhesion property, dust adhesion property, and coloration). The results are shown in Table 4. Note that Table 4 also shows the evaluation results of Example 1 for comparison.

TABLE 4

| | Properties of coating film | Contact angle (°) | Sand dust adhesion property | Dust adhesion property | Coloration |
|---|---|---|---|---|---|
| Example 1 | Slightly cloudy film | 15 | 2 | 2 | 3 |
| Example 9 | Transparent film | 18 | 1 | 2 | 2 |
| Example 10 | Slightly cloudy film | 10 | 3 | 1 | 3 |

As shown in Table 4, using each of the coating compositions of Examples 9 and 10, a uniform and thin coating film was successfully formed on the stainless steel base material. The coating films obtained from the coating compositions of Examples 9 and 10 had low evaluation values with respect to the sand dust adhesion property, dust adhesion property, and coloration, and had excellent antisoiling performance.

Example 11

In Example 11, the coating film obtained from the coating composition which was prepared while changing the mass ratio of ultrafine silica particles to fluororesin particles was evaluated for hydrophilic dirt, hydrophobic dirt, and the contact angle of water.

The coating composition was prepared in the same manner as in Example 1 except for changing the mass ratio of ultrafine silica particles to fluororesin particles. Subsequently, using the coating composition, a coating film was formed on a polyethylene terephthalate film in the same manner as in Example 1. The coating film was evaluated for hydrophilic dirt, hydrophobic dirt, and the contact angle of water.

Figure 5:
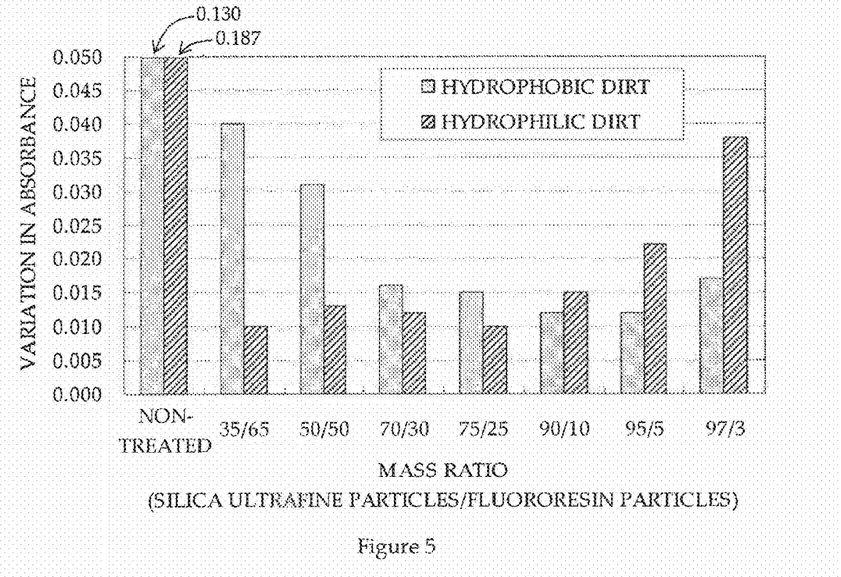
FIG. 5 is a graph showing a relationship between a mass ratio of ultrafine silica particles to fluororesin particles and a variation in absorbance.

Here, hydrophilic dirt was evaluated based on the variation in the absorbance of the coating film, as determined by measuring the absorbance of the coating film before and after air spraying a predetermined amount of Kanto loam dust on the surface of the coating film. Similarly, hydrophobic dirt was evaluated based on the variation in the absorbance of the coating film, as determined by measuring the absorbance of the coating film before and after air spraying a predetermined amount of carbon black on the surface of the coating film. The results are shown in FIG. 5. The absorbance was measured at a wavelength of 400 nm. In this evaluation, the smaller the variation in the absorbance, the smaller the adhesion amount of the hydrophilic dirt or the hydrophobic dirt. For comparison, FIG. 5 is shown as the evaluation results of the hydrophilic dirt and lipophilic dirt of polyethylene terephthalate on which no coating film was formed (which is indicated as "non-treatment" in FIG. 5).

Figure 6:
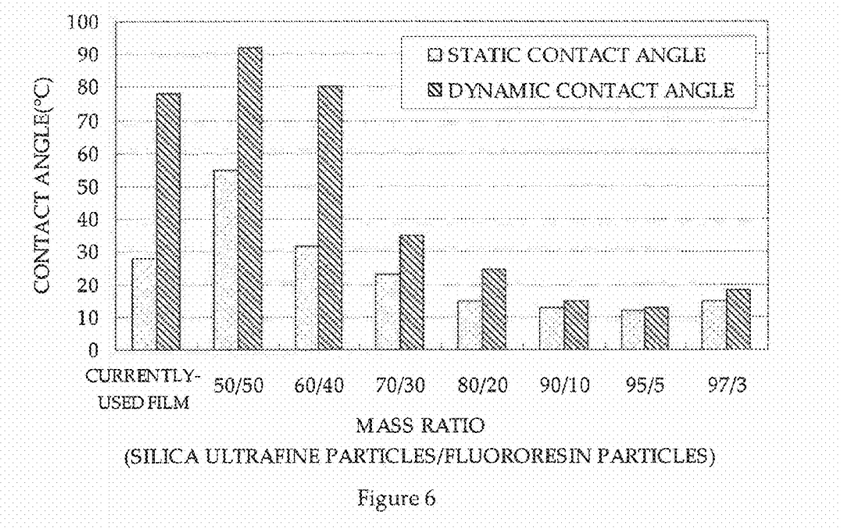
FIG. 6 is a graph showing the relationship between the mass ratio of ultrafine silica particles to fluororesin particles and a contact angle.

As for the contact angle of water, both the static contact angle and the dynamic contact angle were measured with a contact angle meter. The results are shown in FIG. 6. In this evaluation, the smaller the values of the static contact angle and a dynamic contact angle, the higher the hydrophilicity on the surface of the coating film. In particular, when the value of the dynamic contact angle is small, water may readily spread on the surface of the coating film. For comparison, FIG. 6 is shown as the evaluation results of the static contact angle and the dynamic contact angle of a currently-used coating film (coating film consisting of a hydrophilic resin containing polyvinyl alcohol) for use in a fin material (which is indicated as "currently-used film" in FIG. 6).

As is clear from FIG. 5, to the coating film obtained from the coating composition in which the mass ratio of ultrafine silica particles to fluororesin particles is 70:30 to 95:5, both hydrophilic dirt and hydrophobic dirt barely adhered. In contrast, to the coating film obtained from the coating composition in which the mass ratio of ultrafine silica particles is smaller than the above-mentioned range, a great deal of hydrophobic dirt adhered. To the coating film obtained from the coating composition in which the mass ratio of ultrafine silica particles is larger than the above-mentioned range, a great deal of hydrophilic dirt adhered.

As is clear from FIG. 6, in the coating film obtained from the coating composition in which the mass ratio of ultrafine silica particles to fluororesin particles is 70:35 to 97:3, both the static contact angle value and the dynamic contact angle value were small and the hydrophilicity on the surface of the coating film was high. In particular, because such a coating film had a dynamic contact angle value smaller than that of the coating film for use in a currently-used fin material, there is a high possibility that water readily spreads and the occurrence of condensation splash can be effectively prevented when the coating film is formed on a fin of a heat exchanger. In contrast, in the coating film obtained from the coating composition in which the mass ratio of ultrafine silica particles is smaller than the above-mentioned range, both the static contact angle value and the dynamic contact angle value were high and the hydrophilicity was low.

Examples 12 and 13

In Examples 12 and 13, coating compositions in which Na ions as impurities were reduced were prepared.

Colloidal silica containing ultrafine silica particles having an average particle diameter of 6 nm was mixed under stirring with strongly acidic cation exchange resin (DIAION UBK08, manufactured by Mitsubishi Chemical Corporation), thereby reducing Na ions contained in colloidal silica. The degree of Na ion reduction was adjusted by changing the amount of the strongly acidic cation exchange resin.

Na ions in colloidal silica (colloidal silica used in Example 1) before being treated were 1.5 parts by mass based on 100 parts by mass of silica. In contrast, Na ions in colloidal silica after being treated were 0.5 part by mass, 0.1 part by mass based on 100 parts by mass of silica. Here, the content of Na ions was measured by atomic absorption spectrophotometry.

Using colloidal silica containing 0.5 part by mass of Na ions based on 100 parts by mass of silica in Example 12, and using colloidal silica containing 0.1 part by mass of Na ions based on 100 parts by mass of silica in Example 13, coating compositions having the same composition as in Example 1 were prepared in the same manner as in Example 1.

Subsequently, using the coating compositions, coating films were formed on a stainless steel base material in the same manner as in Example 1. The coating film was dipped in running water, and allowed to stand for a predetermined period of time. Thereafter, the resultant coating films were taken out and dried. Then, the contact angles of water were measured. The results are shown in Table 5. For comparison, the coating film of Example 1 was evaluated in the same manner as described above, and the results are also shown in Table 5.

TABLE 5

|  | Initial contact angle (°) | Contact angle after 72 hours of dipping (°) | Contact angle after 144 hours of dipping (°) |
| --- | --- | --- | --- |
| Example 1 | 15 | 30 | 55 |
| Example 12 | 16 | 25 | 30 |
| Example 13 | 14 | 20 | 23 |

As is clear from Table 5, in the coating film of Example 1, the contact angle of water increased and the hydrophilicity decreased because the coating film was in contact with water for a long period of time. In contrast, the coating films in Examples 12 and 13, the increase in the contact angle of water was small and the reduction in the hydrophilicity was small as compared with the coating film of Example 1. Therefore, it was found that a coating film obtained from a coating composition, in which the content of Na ions is low, showed less reduction in the hydrophilicity.

As described above, the coating composition of the present invention can provide a coating film which can readily coat the surfaces of various articles without impairing the color tone and texture of the surfaces and which is excellent in antisoiling performance and durability.

The invention claimed is:

1. A coating composition comprising ultrafine silica particles having an average particle diameter of 15 nm or less, fluororesin particles having an average particle diameter of 50 to 250 nm, and water having an ionic impurities concentration of 200 ppm or less,
   wherein a content of the ultrafine silica particle is from 0.1 to 5 mass %, a content of water is from 30 to 99.5 mass %, and a mass ratio of the ultrafine silica particles to the fluororesin particles is from 70:30 to 95:5, and
   wherein the fluororesin particles is at least one type of particles selected from the group consisting of PTFE particles and FEP particles.

2. The coating composition according to claim 1, wherein the coating composition further comprises at least one surfactant selected form the group consisting of an anionic surfactant and a nonionic surfactant.

3. The coating composition according to claim 2, wherein the surfactant is a polyoxypropylene-polyoxyethylene block polymers, a polycarboxylic acid anionic surfactant, or a mixture thereof.

4. The coating composition according to claim 1, wherein the coating composition further comprises 3-(2-aminoethyl) aminopropyl trimethoxy silane, 3-glycidoxypropyltrimethoxy silane, 3-methacryloxy propyl methyldimethoxy silane, or a mixture thereof.

5. The coating composition according to claim 1, wherein the average particle diameter of the ultrafine silica particles is from 4 to 12 nm.

6. The coating composition according to claim 1, wherein the content of the ultrafine silica particles is from 0.3 to 2.5 mass %.

7. The coating composition according to claim 1, wherein the average particle diameter of the fluororesin particles is from 100 to 250 nm.

8. The coating composition according to claim 1, wherein the mass ratio of the ultrafine silica particles to the fluororesin particles is from 75:25 to 90:10.

9. The coating composition according to claim 1, wherein the ionic impurities concentration is 50 ppm or less.

10. The coating composition according to claim 1, further comprising fine silica particles having an average particle diameter of from 20 to 200 nm.

11. The coating composition according to claim 10, wherein a content of the fine silica particles is form 0.1 to 20 parts by mass based on 100 parts by mass of the ultrafine silica particles and the fine silica particles.

12. The coating composition according to claim 1, wherein a content of alkali metals impurities if 0.5 parts by mass or less based on 100 parts by mass of a silica component, wherein the silica component is the ultrafine silica particles or when the coating composition further contains fine silica particles, based on the total mass of the ultrafine silica particles and the fine silica particles.

13. A method for producing a coating composition comprising:
   dispersing ultrafine silica particles having an average particle diameter of 15 nm or less in water having an ionic impurities concentration of 200 ppm or less to prepare an ultrafine silica particle dispersion,
   dispersing fluororesin particles having an average particle diameter of 50 to 500 nm in water having an ionic impurities concentration of 200 ppm or less to prepare a fluororesin particle dispersion, and
   mixing the ultrafine silica particle dispersion and the fluororesin particle dispersion, wherein a content of the ultrafine silica particle is from 0.1 to 5 mass % and a content of water is from 30 to 99.5 mass %, based on the total mass of the composition, and a mass ratio of the ultrafine silica particles to the fluororesin particles is from 70:30 to 95:5, and wherein the fluororesin particles is at least one type of particles selected from the group consisting of PTFE particles and FEP particles.

14. The method according to claim 13, wherein the pH of the ultrafine silica particle dispersion is the same as that of the fluororesin particle dispersion.

15. The method according to claim 13, wherein an anionic surfactant or nonionic surfactant is mixed with the ultrafine silica particle dispersion and the fluororesin particle dispersion.

* * * * *